Aug. 21, 1962     C. J. VERWAY     3,050,083
METERING VALVE BLOCK

Filed July 10, 1958     2 Sheets-Sheet 1

INVENTOR.
CLAIR J. VERWAY
BY
*Price and Heneveld*
ATTORNEYS

Aug. 21, 1962   C. J. VERWAY   3,050,083
METERING VALVE BLOCK
Filed July 10, 1958   2 Sheets-Sheet 2

INVENTOR.
CLAIR J. VERWAY
BY Price and Heneveld
ATTORNEYS

United States Patent Office 3,050,083
Patented Aug. 21, 1962

3,050,083
METERING VALVE BLOCK
Clair J. Verway, Grand Rapids, Mich., assignor to C. J. Verway Company, Grand Rapids, Mich., a corporation of Michigan
Filed July 10, 1958, Ser. No. 747,670
4 Claims. (Cl. 137—625.18)

This invention relates to metering valve assemblies, and more particularly to a fluid flow metering valve block for regulating the flow of coolant with machine tool operations.

It is customary to use some means of cooling a machine tool or its work area in order to eliminate tool wear, reduce the burning of work parts and to enable obtaining an improved finish on the work part. Heretofore, the most commonly used means for cooling a work area has been by splashing or flooding the work area with coolant. This involves directing a steady flow of coolant fluid directly on the work part in the vicinity of the work tool. It also requires collecting, recirculating and reclaiming the coolant to prevent waste. There is still considerable waste of the coolant in such coolant systems both in the reclaiming process and due to that which splashes off the work piece. The heavy flow and resultant splash also requires splash guards to localize the coolant flow and to enable recovering as much of the coolant as possible.

The cooling of work areas by flood or splash control is very unsatisfactory. The operation is dirty and messy for the operator. The splash loss usually results in oil soaked and dirty floors which are both a safety and a fire hazard. The use of large and bulky splash shields obscures the work and reduces accessibility to the work area.

It is an object of this invention to disclose a valve block for controlling the flow of coolant to a work area. The valve block of this invention provides positive control of the flow and intermixing of coolant air and liquid.

It is also an object of this invention to disclose a coolant flow metering block having individual controls for regulating the specific volume of liquid and air as required by a particular machine tool operation.

It is another object of this invention to provide a control assembly for regulating the ratio of fluid to air to provide a steady flow of fluid, a droplet of fluid, or a fluid mist, whichever best serves to cool the work area involved.

Still another object of this invention is to disclose a coolant system in which there is no waste of coolant fluid. There is no splash, waste, or carry off as in flood control.

A further object of this invention is to keep the fluid and air of the coolant separate up to their point of use.

A still further object of this invention is to provide a single on-off control for coolant flow. This control may be either manually or electrically operated. The control is particularly well suitable for solenoid operation. The control herein disclosed is inexpensive to manufacture, simple to operate, and highly satisfactory for its intended purpose.

An even further object of this invention is to disclose a coolant system which is much cleaner than those previously used and has resultant safety advantages.

Among the objects of this invention is to provide a coolant system which eliminates the need for splash shields and thereby provides better work visibility and accessibility.

Also among the objects of this invention is to provide a coolant system which assures longer tool life by reducing the down time for the machine tool operation.

Still further among the objects of this invention is to provide a coolant system which enables the production of cool clean parts for greater ease in handling, improved surface finishes for the work parts, and a system adaptable for use on operations which previously were required to run dry.

These and other object and advantages in the practice of this invention will be more apparent in the illustration and description of a working embodiment of the invention, as hereinafter set forth.

Figure 1:
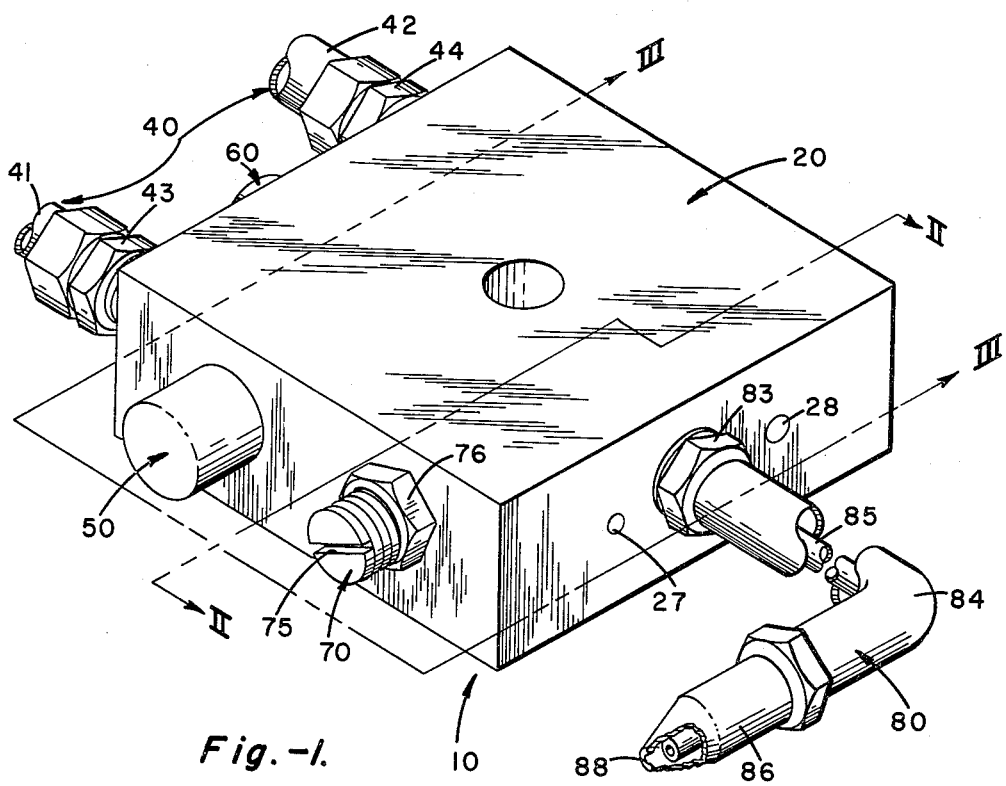
FIG. 1 is a perspective view of the metering valve block assembly for coolant flow control.
Figure 2:
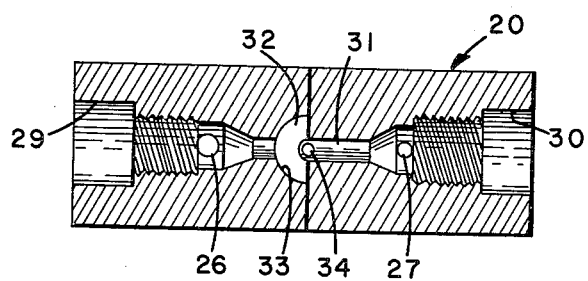
FIG. 2 is a cross sectional view through the metering valve control passages of the valve block as seen in the plane of line II—II of FIG. 1 and looking in the direction of the arrows thereon.

The coolant flow metering valve assembly of this invention includes a valve block which has a plurality of separate passages formed therethrough. Certain of these passages intersect other passages and are receptive of means for controlling the flow of air and liquid fluids through the valve block. The air and liquid fluid passages are at all times separated in the valve block. A single control piston is disposed within one of the passages of the valve block for simultaneously but separately opening or closing the different fluid flow passages. Separate needle valves regulate the amount of air and liquid passing through the valve block. The outlet ends of the flow passages terminate in concentric passages which enable the fluids to be carried away by a flexible conduit and to remain separated until received at the flow nozzle of the conduit which is located at the machine tool work area to be cooled.

Referring to the drawings in further detail, the metering valve assembly 10 is shown to include a valve block 20. Separate air and fluid lines 40 are connected to the valve block. A control plunger or piston 50 is slidably mounted within the valve block 20 normal to the air and fluid lines 40. Metering valves 70 are provided through opposite sides of the valve block 20. A flexible conduit 80 is connected to the end of the valve block 20, opposite the air and fluid lines 40.

The valve block 20 is formed to include a plurality of passages formed therethrough. As will be seen, these passages are all straight lined passages, each portion of each passage being normal to and accessible from at least one of the faces of the block. Furthermore, it will be readily seen from FIG. 3 that no passage increases in diameter in a direction away from the face from which it is accessible, and that the fluid flow passages have no restriction except at the valves. This greatly simplifies the manufacture of the block, thus reducing its cost, and also simplifies cleaning of the passages and valves if they should become clogged.

The valve block 20 includes air and fluid inlet passages 21 and 22 formed within one end thereof and in parallel spaced relation to each other. The inlet passages 21 and 22 are threaded for connection of the air and fluid lines 40 therein.

A control piston passage 23 is formed clear through the valve block normal to the inlet passages 21 and 22. The piston passage 23 and the inlet passages 21 and 22 are in communication by means of reduced area passage extensions 24 and 25 of the inlet passages.

Intermediate passages 26 and 27 are formed in parallel spaced relation to each other through the outlet end of the valve block. These passages intersect, and are in communication, with the piston passage 23. Their outer ends are closed by closure members 27 and 28.

Metering valve passages 29 and 30 are formed through opposite sides of the valve block 20. The metering valve passages intersect the intermediate passages 26 and 27 and extend therebeyond. The metering valve passages 29 and 30 are axially spaced apart and have their ends extended in overlapping relation. The one metering valve passage 29 forms a reduced area passage 31 while the other metering valve passage opens into a chamber end 32.

Concentric outlet passages 33 and 34 are connected to the passage 31 and chamber 32 and are exposed at the outlet side of the valve block 20.

The air and fluid lines 40 comprise supply conduits 41 and 42. One of these conduits, e.g. 42, is intended to supply air to the valve block 20 and the other to supply a coolant liquid. The conduits 41 and 42 are connected to the valve block 20 by threaded couplings 43 and 44 received within the threaded inlet passages 21 and 22 of the valve block.

The control plunger or piston 50 is slidably mounted in the valve block 20 within the piston passage or bore 23. The piston member includes bearing shoulders 51 and 52 at each end. Bearing surfaces 53 and 54 are also provided intermediate the ends of the piston. Annular grooves 55 and 56 are formed about the piston member near the bearing shoulder ends 51 and 52 thereof. A detent-receptive annular groove 57 is formed about the piston member centrally thereof and between the bearing surfaces 53 and 54. O-ring seals 58 are provided within the bearing surfaces 51—54 as necessary for proper fluid sealing and are arranged for a particular purpose discussed below.

Figure 3:
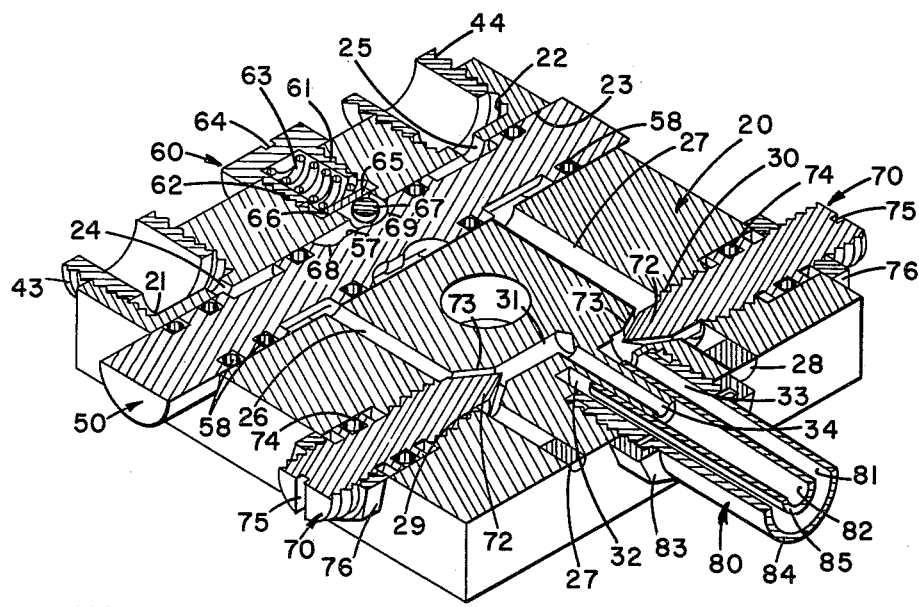
FIG. 3 is a cross sectional view of the valve block assembly as seen in the plane of line III—III.

The axial dispostion of the piston member 50 as shown in FIG. 3 places the annular grooves 55 and 56 in position to interconnect the inlet passages 21 and 22 with the intermediate passages 26 and 27, respectively. When the piston member 50 is disposed in the axial position of FIG. 4 the inlet passages 21 and 22 are cut off from the intermediate passages 26 and 27. Further, one of the sealing rings 58 is moved between the inlet and intermediate passages for more positive shut-off. The air and liquid fluid supply to the valve block 20 is thus simultaneously cut off from, or interconnected to, the flexible outlet conduit 80 by a simple movement of the piston or plunger member 50.

The axial position of the piston member 50 is determined and held by detent means 60. The detent means 60 are provided within the valve block 20 between the inlet passages 21 and 22. Such means includes a threaded plug 61 received in a threaded passage 62 which is normal to the piston passage 23 and between the inlet passages 21 and 22, as aforesaid. The plug 61 is hollow in order to receive a compression spring 63. The end of the plug is slotted as at 64. The end of the spring is engaged with a plate 65 resting on shoulder 66 at the end of the detent passage 62. A ball detent 67 is disposed within the inner end of the detent passage 62 and is partially received within the detent-receptive groove 57 of the control piston or plunger 50. The detent groove 57 of the piston member includes detent depressions 68 and 69 at opposite ends thereof. Accordingly, the plunger is held in one of two axial positions by the receipt of the ball detent 67 in one of the detent depressions 68 or 69.

The metering valves 70 include threaded shanks 71. The valves 70 are received within the metering valve passages or apertures 29 and 30 which are threaded to receive the threaded shanks 71 thereof. The ends of the valve 70 are conical in shape to provide needle valves 72 which are received within a valve seat 73 formed in the valve passages 29 and 30. The valve seats 73 are provided between the intermediate passages 26 and 27 and the extended and chamber ends 30 and 31 of the metering valve passages. O-ring seals 74 are provided about the metering valves for proper fluid sealing. The ends of the valve shank 71 are slotted as at 75 to allow for adjustment control. Lock nuts 76 are provided on the ends of the metering valves for locking them in their selected positions.

The flexible conduit 80 is connected to the valve block 20 within the concentric outlet passages 33 and 34. The conduit itself includes concentric passages 81 and 82. A collar coupling 83 is used for connecting the outer wall 84 of the flexible conduit in sealed engagement to the valve block 20. The inner wall 85 of the conduit telescopes over the part of the block including the central outlet passage 33. The flexible conduit terminates in a nozzle 86. It will be noted that the passage walls 84 and 85 extend to the nozzle 86 and that there is a single nozzle outlet opening 88. Thus, the air and liquid fluids are mixed together only as they leave the nozzle.

*Operation and use*

The different parts of the valve assembly 10 are preferably of a non-corrosive brass. This assures long serviceable trouble-free life for the unit.

The valve assembly 10 is intended to reduce coolant costs. Only such liquid as is necessary to dissipate heat is required to be used. The use of more liquid serves no purpose and is wasteful. Only such air as is necessary to break up the liquid coolant into a desired droplet size need be used. The use of excess air serves no purpose and may fog oil base mediums with a resultant increase in compressed air requirements.

Accordingly, the valve assembly 10 should be adjusted and set to suit the requirements of each machine tool operation and the requirements of each particular job performed by the machine tool. The disclosed valve assembly will increase tool life and production on operations such as grinding, polishing, reaming, drilling, tapping, boring, turning, milling, shaping, extruding, stamping and pressing.

The metering valves 70 assure positive control of liquid and air flow for coolant purposes. The individual metering valves 70 enable the delivery of specific volumes of air and liquid in proper proportion, and as required by different machine tool operations and jobs. The coolant flow may be varied from a steady flow to a droplet or a mist or spray pattern.

In setting the valves 70, the locked nuts 76 are backed off towards the outer ends of the threaded shanks 71. The needle valve ends 72 are then adjusted relative to the valve seats 73 by means of the coin slots 75 in the ends of the valve shanks. The flow of coolant should be regulated until the work piece and the tool are practically dry at the conclusion of the machine tool operation. Once the metering valves 70 have been set, the lock nuts 76 are threaded down. No further adjustment of the metering valves 70 is required. The only operational adjustment, thereafter, is that of the piston control 50. The valve assembly 10 will continue to supply the designated proportion of liquid and air until a new setting of the valve assembly is required for a different machine tool operation or job.

The use of pressurized fluids assures continuous and consistent coolant flow for all critical operations. The variance permissive in the amount of coolant flow, by use of the metering valves 70, enables the use of coolant on operations that previously were required to run dry.

Cutting, grinding, or lubricating compounds used in the coolant system including this valve assembly, are of secondary importance. Since very little liquid is used it is preferable that a compound be used that remains in solution for extended periods of time. A water soluable compound is particularly good. With certain operations requiring lubrication an oil medium may be added.

Once the metering valves 70 are set and the flexible conduit 80 is disposed with the nozzle end 86 at the work area, all that remains is to supply air and liquid to the inlet lines 40 and then to move the piston plunger 50 to the on or off positions as required.

Figure 4:
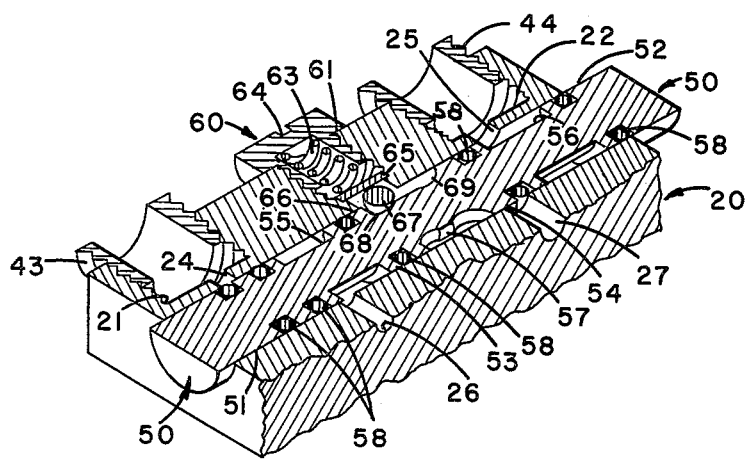
FIG. 4 is a cross sectional view of the metering valve block of FIG. 1 as seen in the plane of line III—III and showing the control piston in a different position from that shown by FIG. 3.

When the control piston 50 is in the position shown by FIG. 4, a pair of the sealing rings 58 are disposed between the inlet passage ends 24 and 25 and the intermediate passages 26 and 27. They thus seal the one from the other. The ball detent 67 is biased into engagement with the piston 50 within the depression 68. This holds the plunger 50 in the off position.

When the piston plunger 50 is axially shifted the sealing rings 58 are removed from between the inlet and intermediate pasages and these passages are connected by means of the annular grooves 55 and 56 formed about the piston plunger member. The ball detent 67 is received in the detent depression 69 and holds the plunger valve in the on position. The flow of liquid and air in the valve assembly 10 is through their separate passages clear to their point of application.

It will be noted that in addition to the sealing rings 58 disposed on either side of the passage extensions 24, 25 when the plunger 50 is in the position of FIG. 4, an extra sealing ring 58 is provided in the bearing surface 53. The purpose of this ring is to prevent seepage of the fluid retained in groove 55 along bearing surfaces 53 and 54 when the plunger 50 is in the closed position. Such seepage, if permitted, could interfere with the accuracy of the air supply and could thus cause objectionable "spitting." Furthermore, it will be noted from an inspection of FIG. 3 that when the plunger 50 is in the open position, the second sealing ring from the right on the plunger is located between passage 27 and groove 57. The purpose of this arrangement is to seal the chamber formed by the groove 57 so that if the sealing ring located between grooves 55 and 57 becomes unable to resist the pressure of the liquid in groove 55, the pressurized liquid in groove 55 cannot flow into the chamber formed by groove 57 because it would have to displace air in the chamber in order to do so. Consequently, no liquid can accumulate in the chamber and leak from there across bearing surface 54 into air passage 27 when the plunger 50 is moved to the position of FIG. 4. This can become very important in some applications, such as where a carefully measured amount of oil suspension is to be sprayed on steel strips rolled to precision tolerances. By this arrangement, a single sealing ring alternately closes the air passage and seals the chamber formed by groove 57, as the pressure conditions in the valve block require.

In short, the sealing ring arrangement of this invention provides effective seepage protection when groove 55 is not under pressure, and double leakage protection when groove 55 is under pressure.

The axially slidable form of the control piston 50 makes it particularly well adapted for solenoid operation. A solenoid connected to one end or the other of the control piston 50 would operate it between its on and off positions within the limits defined by the detent means 60.

While I have described a preferred embodiment of my invention, it is to be understood that various modifications of this invention may be made. Each of these modifications which embodies the principles of this invention is to be considered as included in the following appended claims unless these claims by their language expressly state otherwise.

I claim:

1. A fluid flow metering valve assembly, comprising: a valve block having a plurality of separate straight line passages formed through the side edges thereof, certain of said passages intersecting other of said passages and being receptive of means for controlling the flow of fluid through said valve block, said passages including separate air and liquid fluid inlet passages disposed in parallel spaced relation through one side edge of said valve block, a control piston passage formed through opposite side edges of said block normal to and intersecting said air and liquid fluid inlet passages, separate intermediate passages formed through the side edge of said block opposite said one side edge and terminating in communication with said control piston passage, said intermediate passages being axially spaced from said inlet passages and having their outer ends closed, a control piston received in said piston passage and including annular shoulders and passages for simultaneously and selectively interconnecting and separating said intermediate passages from said inlet passages, said control piston being axially adjustable within said piston passage and having between the piston grooves detent means engaged therewith for holding said piston in its selected control position, separate metering valve passages formed through opposite sides of said block and each transversely intersecting one of said intermediate passages, said metering valve passages being axially spaced and extending in overlapping relation to each other, metering valves operatively engaged within said metering valve passages for selectively controlling the air and liquid fluid flow therein, and separate concentric passages formed through said valve block normal to said metering valve passages and each intersecting a different one of said metering valve passages at their overlapping ends.

2. A combination flow control and proportioning valve, comprising: a housing; a first inlet port; a second inlet port and a discharge port; passages connecting each of said inlet ports to said discharge port; a single flow shutoff valve intercepting both of said passages, said shutoff valve being movable between each of two positions; a pair of adjacent annular grooves formed in the core of said shutoff valve and cooperating with detent means mounted on said housing to bias said shutoff valve into either one of its two extreme positions, said grooves and detent means being located between said passages and being isolated from said inlet parts by sealing rings, and said inlet parts being in turn isolated from the outside of said housing by sealing rings, said shutoff valve in one position simultaneously shutting off flow in both of said passages and in another position permitting flow in both of said passages; a first volume regulating needle valve in one of said passages and a second volume regulating needle valve in the other of said passages; each of said valves being adjustable each independently of the other and of said shutoff valve; all of said valves and passages being within said housing.

3. A valve assembly for simultaneous control of a pair of fluid passages comprising: a valve block, first and second fluid passages separated from one another throughout said valve block, and a reciprocable control plunger associated with both said passages and movable in a bore of said block between an open and a closed position, said control plunger comprising first and second annular grooves, said first groove being in communication with the outlet side of said first passage when said plunger is in the closed position, and connecting the inlet and outlet sides of said first passage when said plunger is in the open position, said second groove being in communication with the inlet side of said second passages when said plunger is in the closed position, and connecting the inlet and outlet sides of said second passage when said plunger is in the open position, first sealing means interposed between the inlet sides of said passages and the ends of said bore adjacent thereto, second sealing means positioned between the inlet side of said first passage and said first groove when said plunger is in the closed position, third sealing means permanently interposed between said first groove and the outlet side of said second passage, and fourth sealing means positioned between the outlet side of said second passage and said second groove when said plunger is in the closed position, and between said outlet side of said second passage and said third sealing means when said plunger is in the open position.

4. A valve assembly for simultaneous control of a pair of fluid passages comprising: a valve block, first and second fluid passages separated from one another throughout said valve block, and a reciprocable control plunger associated with both said passages and movable in a bore of said block between an open and a closed position, said control plunger comprising first and second annular grooves, said first groove being in communication with the outlet side of said first passage when said plunger is in the closed position, and connecting the inlet and outlet sides of said first passage when said plunger is in the open position, said second groove being in communication with the inlet side of said second passage when said plunger is in the closed position, and connecting the inlet and outlet sides of said second passage when said plunger is in the open position, a third annular groove interposed between said first and second grooves, first sealing means interposed between the inlet sides of said passages and the ends of said bore adjacent thereto, second sealing means positioned between the inlet side of said first passage and said first groove when said plunger is in the closed position, third sealing means interposed between said first and third grooves, and fourth sealing means positioned between the outlet side of said second passage and said second groove when said plunger is in the closed position, and between said outlet side of said second passage and said third groove when said plunger is in the open position.

References Cited in the file of this patent

UNITED STATES PATENTS

| | | |
|---|---|---|
| 1,395,537 | Walker | Nov. 1, 1921 |
| 2,043,982 | Bruneau | June 16, 1936 |
| 2,380,827 | Downs | July 31, 1945 |
| 2,577,437 | Stringer | Dec. 4, 1951 |
| 2,635,010 | Sanders | Apr. 14, 1953 |
| 2,713,989 | Bryant | July 26, 1955 |
| 2,759,772 | Hopkins | Aug. 21, 1956 |
| 2,793,657 | McCullough | May 28, 1957 |